US009452576B2

United States Patent
Hahn (10) Patent No.: US 9,452,576 B2
(45) Date of Patent: Sep. 27, 2016

(54) METHOD OF TREATING PLASTICS MATERIAL CONTAINERS WITH REDUCTION OF TIME DURING THE SYNCHRONIZATION OF PARTS OF THE PLANT

(71) Applicant: KRONES AG, Neutraubling (DE)

(72) Inventor: Wolfgang Hahn, Neutraubling (DE)

(73) Assignee: KRONES AG (DE)

( * ) Notice: Subject to any disclaimer, the term of this patent is extended or adjusted under 35 U.S.C. 154(b) by 513 days.

(21) Appl. No.: 13/847,491

(22) Filed: Mar. 20, 2013

(65) Prior Publication Data

US 2013/0277892 A1    Oct. 24, 2013

(30) Foreign Application Priority Data

Mar. 20, 2012 (DE) .......................... 10 2012 102 358

(51) Int. Cl.
| | |
|---|---|
| B29D 22/00 | (2006.01) |
| B29C 49/42 | (2006.01) |
| B29C 49/64 | (2006.01) |
| B29C 49/78 | (2006.01) |
| B29L 31/00 | (2006.01) |
| B29C 49/06 | (2006.01) |

(Continued)

(52) U.S. Cl.
CPC ......... *B29D 22/003* (2013.01); *B29C 49/4205* (2013.01); *B29C 49/6409* (2013.01); *B29C 49/78* (2013.01); *B29C 49/06* (2013.01); *B29K 2105/26* (2013.01); *B29L 2031/7158* (2013.01); *B67C 2003/227* (2013.01)

(58) Field of Classification Search
None
See application file for complete search history.

(56) References Cited

U.S. PATENT DOCUMENTS 6,241,939 B1 * 6/2001 Takada et al. ................ 264/535
8,806,840 B2    8/2014 Bierschneider (Continued)

FOREIGN PATENT DOCUMENTS

CN          101992544 A       3/2011
DE    10 2008 021 527 A1    11/2009

(Continued)

OTHER PUBLICATIONS

Chinese Office Action dated Feb. 11, 2015, issued in corresponding Chinese Application No. 201310090491.9.

(Continued)

*Primary Examiner* — Jacob Thomas Minskey
(74) *Attorney, Agent, or Firm* — Hayes Soloway P.C.

(57) ABSTRACT

A method of treating plastics material pre-forms may include conveying plastics material pre-forms by means of a conveying device, heating the plastics material pre-forms, during said conveying step, by a heating device, and treating the plastics material pre-forms, after said heating step, by a further treatment device in a further pre-set manner. The heating device and the further treatment device are operated in a synchronized manner at least for a time. In the event of an error state occurring in said further treatment device arranged downstream of the heating device, a supply of the plastics material pre-forms to the heating device is interrupted by means of a blocking device. Chronologically after the occurrence of the error state the further treatment device is brought into synchronism again with the heating device during a pre-set synchronization period. The supply of the plastics material pre-forms to the heating device is permitted again during the synchronization period or at the start of the synchronization.

18 Claims, 4 Drawing Sheets

(51) Int. Cl.
   *B29K 105/26*   (2006.01)
   *B67C 3/22*    (2006.01)

(56) References Cited

U.S. PATENT DOCUMENTS

| | | | |
|---|---|---|---|
| 2002/0175448 A1* | 11/2002 | Pena | 264/406 |
| 2010/0011712 A1 | 1/2010 | Till | 53/467 |
| 2011/0236517 A1* | 9/2011 | Senn et al. | 425/145 |
| 2011/0260372 A1 | 10/2011 | Hahn | |
| 2011/0298145 A1 | 12/2011 | Lappe et al. | |

FOREIGN PATENT DOCUMENTS

| | | | | |
|---|---|---|---|---|
| DE | 10 2010 029 644 A1 | 12/2011 | | |
| EP | 1 837 157 | 9/2007 | | B29C 49/42 |
| EP | 2 392 447 | 12/2011 | | B29C 49/42 |

OTHER PUBLICATIONS

EPO Communication issued in corresponding EPO Patent Appln. No. 13160220.3-1706 dated Aug. 1, 2013 (6 pgs).
English translation of the Text of the Second Office Action issued in corresponding Chinese Patent Appln. No. 201310090491.9 (3 pgs).

* cited by examiner

METHOD OF TREATING PLASTICS MATERIAL CONTAINERS WITH REDUCTION OF TIME DURING THE SYNCHRONIZATION OF PARTS OF THE PLANT

CROSS-REFERENCE TO RELATED APPLICATION

This application claims the benefit of priority of German Patent Application No. 10 2012 102 358.1, filed Mar. 20, 2012, pursuant to 35 U.S.C. 119(a)-(d), the disclosure of which is incorporated herein by reference.

TECHNICAL FIELD

The present disclosure relates to a method of treating plastics material containers and to a plant adapted to this method.

BACKGROUND

Various methods for treating plastics material containers are known from the prior art. In this case it is also known, in particular, to heat plastics material pre-forms first in a heating device or a furnace respectively and then to shape them in this heated state in a shaping device, for example a stretch blow moulding machine, into beverage containers.

Stretch blow moulding machines of this type frequently have further attached to them a filling device which fills the containers with a liquid, for example a beverage. In this case plants are known in the prior art which have—between these individual parts of the plant—buffer paths which can receive a variable number of plastics material pre-forms. Buffer paths of this type, however, are relatively cost-intensive. In addition, plants in which the individual units are grouped in a block or synchronized respectively with one another at least in part are also known in the prior art. If a certain unit breaks down in a state of this type, then this also affects the preceding units. In the case of the heating device mentioned above which heats the plastics material pre-forms this can be problematic since in the event of a stoppage of the transportation of the containers through the heating device the latter can become rapidly over-heated. It is therefore known from the prior art for the further supply of plastics material pre-forms into the heating device to be stopped first of all by means of a blocking in the event of a stoppage, for example of a filling means arranged downstream. After that, the heating device is run empty and the plastics material pre-forms already heated are separated out.

After the defect has then been rectified on the following component, it would be possible in principle for the production to continue. For the purpose of synchronization with the following component, for example a filling means, however, a certain amount of time is necessary which is not available to the production process. A plant and a method for the production of containers are known from DE 10 2008 021 527 A1 (U.S. Published Patent Application No. 2011/0260372). In this case this plant is able, in the event of a breakdown being detected in a treatment apparatus, to discontinue for a time the synchronization of a container production apparatus with a further treatment apparatus, such as for example a filling means. The contents of the disclosure of this application are hereby also made the contents of the disclosure of the present application with respect to the description of the plant given in this document (paragraphs [0038] to [0043]) as well as the specific description of the method (paragraphs [0044] to [0059]).

A method of operating a filling plant has been described in the German Patent Application No. 10 2010 042 624.5 not yet published hitherto. In this case the phase of synchronizing a filling plant in particular is again described. The subject matter of this patent application is likewise also made the subject of the present application by reference in its entirety with respect to the synchronization (general description).

In particular, in the case of more recent synchronized plants or blocks comprising a stretch blow moulding machine and a filling means it is possible with improved control means for a more rapid start of the block and thus a higher degree of efficiency and a higher degree of availability to be achieved. In this case, with this control means, a stretch blow moulding machine and the further machines grouped into a block are synchronized after a breakdown, before a pre-form blocking is opened again. Depending upon the performance, this can have a duration in a range of 15 seconds.

Therefore, it may be desirable to reduce losses of time which arise, in particular, after a breakdown. This may be attained according to methods and apparatuses according to the disclosure and claims.

SUMMARY

According to various aspects of the disclosure, a method for the treatment of plastics material containers may include conveying plastics material pre-forms by means of a conveying device and heating the pre-forms by a heating device during this conveying. After this heating the plastics material pre-forms are treated by a further treatment device in a further pre-set manner, in which case the heating device and the further treatment device are operated in a synchronized manner at least for a time.

In the event of an error state occurring, in particular in a treatment device arranged downstream of the heating device, a supply of the plastics material pre-forms to the heating device is interrupted by means of a blocking device. In addition, chronologically after the occurrence of the error state the further treatment device is brought into synchronism again with the heating device during a pre-set synchronization period. According to the disclosure, the supply of the plastics material pre-forms to the heating device is already permitted (again) during the synchronization period or at the start of the synchronization. In this way, in particular, the entire period of time of the synchronization including the starting time thereof is considered below as being the synchronization period.

If, when an error state occurs, the heating device of the stretch blow moulding machine is empty or at least a pre-set gap has been formed between the plastics material pre-forms which in some exemplary aspects is greater than the duration of the synchronization, it is proposed according to the disclosure that the pre-form blocking should be opened again at the start of the synchronization or after the start and again before the end of the synchronization procedure. It is thus carried out up to approximately 15 seconds earlier for the duration of the synchronization, and this is generally possible in the case of any error states which have already been rectified. In this way, an increase in efficiency can be achieved, in particular when error states occur.

In other words, if the supply of the plastics material pre-forms is allowed again even before the actual synchronization is achieved, a gain in time is made possible in this way. It would even be possible to allow the supply of the plastics material pre-forms again at the start of the synchronization procedure.

When an error state arises it may be advantageous for the synchronization between the heating device and the further treatment device to be discontinued at least for a time. In particular, a discontinuation of this type takes place during a stoppage or a slowed down operation of the treatment device (in particular, the treatment device at which the error state has occurred). In normal working operation the heating device and the further treatment device are (or have been) synchronized, i.e. are operated in particular at the same working speed. In the event of an error state occurring, it may be necessary for this synchronization to be discontinued, since the heating device possibly continues to operate, whereas the further treatment device is stopped or is operated at a different speed. For this reason, the synchronization is discontinued in particular after the occurrence of an error state and/or for the purpose of rectifying the error state.

In the case of a further exemplary method the first further treatment device is a shaping device which shapes the plastics material pre-forms into plastics material containers.

It may be exemplary for a filling device, which fills the plastics material pre-forms with a liquid and, in particular, a beverage, to be provided downstream of the first further treatment device.

In the case of a further exemplary method a plurality of machines of the plant are synchronized with one another. In this way for example, the stretch blow moulding machine can be jointly synchronized with the heating device so that, in addition, a synchronization with further machine parts such as the aforesaid filling device may take place.

In the case of a further exemplary method a duration of the synchronization time is determined. This can be carried out empirically for example, in that the time which has elapsed since the start of the synchronization until the complete achievement of the synchronization is measured in the case of earlier error rectifications in each case. In addition, it may also be advantageous to determine a gap between the plastics material pre-forms in the heating device and the length of this gap respectively. This gap is formed by the closure of the blocking device for the plastics material pre-forms. The length of this gap depends upon how much time is required to rectify a state, such as in particular an error state. The length of this gap between the plastics material pre-forms can be carried out in this case for example by counting the unoccupied holding devices which convey the plastics material pre-forms.

It may be advantageous for the conveyor device to have a plurality of holding devices which hold the plastics material pre-forms during the conveying thereof through the heating device. In this case these heating devices can be for example mandrels which engage in the apertures of the containers and hold them in this way. In addition, the determination of this gap in and/or between the plastics material pre-forms can also be determined by a time setting, for example by determination of the length of time during which the blocking device has been blocked. In this case it may be preferable for an operating speed of the plant also to be taken into consideration at, for example, an average conveying speed of the plastics material pre-forms.

If the length of this gap between the plastics material pre-forms is sufficiently large or if the blocking device has been blocked for sufficiently long, the blocking device and thus the run-in of the plastics material pre-forms can take place simultaneously at the beginning of the synchronization. The synchronization may be advantageously achieved before the blow moulded containers reach the transfer point to be synchronized, which can be situated for example at the run-in of the filling device.

In the case of a further exemplary method, an ejection device can be additionally activated at the run-out of the heating device in order to prevent those cases in which the synchronization lasts longer than expected as a result of breakdowns or the like. In this case plastics material pre-forms can again be ejected, for example, directly downstream of the furnace, i.e. the heating device.

It may be advantageous for the point in time of permitting the supply of the plastics material pre-forms also to depend upon a length of time of the interruption of the supply of the plastics material pre-forms, but it is determined in a manner independent of this length of time.

In the case of a further exemplary method heated plastics material pre-forms and/or manufactured containers are separated out before reaching the filling device—in particular in the event of an error state occurring.

These separated out plastics material pre-forms and/or containers can be destroyed in this case—under certain conditions, however, they can also be re-used, for example, at least in part.

It may thus be advantageous for a pre-set portion of the separated out plastics material pre-forms to be re-heated once more and by means of the heating device. With this heating of the plastics material pre-forms a critical threshold temperature occurs, beyond which the plastics material pre-forms can no longer be re-used. The idea of this arrangement is that at least those plastics material pre-forms which have not yet reached the critical threshold temperature are re-used.

The present disclosure further relates to an apparatus for the treatment of plastics material pre-forms. This apparatus has a conveying device which conveys the plastics material pre-forms along a pre-set conveying path. In addition, the apparatus has a heating device, which heats the plastics material pre-forms during their conveying, as well as a shaping device, which is arranged downstream of the heating device and which shapes the heated plastics material pre-forms into plastics material containers. In addition, the apparatus also has a filling device which fills the plastics material pre-forms with a liquid. In this case the heating device, the shaping device and the filling device are synchronized with one another in a working operation of the apparatus. In addition, the apparatus has a blocking device which is arranged upstream of the heating device in the conveying direction of the plastics material pre-forms and which is suitable and intended for interrupting a supply of the plastics material pre-forms to the heating device—in particular in the event of an occurrence of an error state in a device arranged downstream of the heating device.

According to the disclosure the blocking device is controlled in such a way that it can release the supply of the plastics material pre-forms to the heating device again at a point in time at which the heating device and at least one of the devices arranged downstream of this heating device have not yet been synchronized again. In this case it is even possible for the blocking device to release the supply of the plastics material pre-forms again even at the start of the aforesaid synchronization. It may be advantageous for it to be possible for the blocking device to release the supply of the plastics material pre-forms upon a demand from the user.

In the case of an exemplary embodiment the apparatus has a separation device arranged downstream of the blocking device along the conveying path of the plastics material pre-forms in order to separate the plastics material pre-forms out of the conveying path. It may be advantageous for such a separation device also to be arranged downstream of the heating device.

Further advantages and embodiments will become evident from the attached drawings.

DETAILED DESCRIPTION

Figure 1:
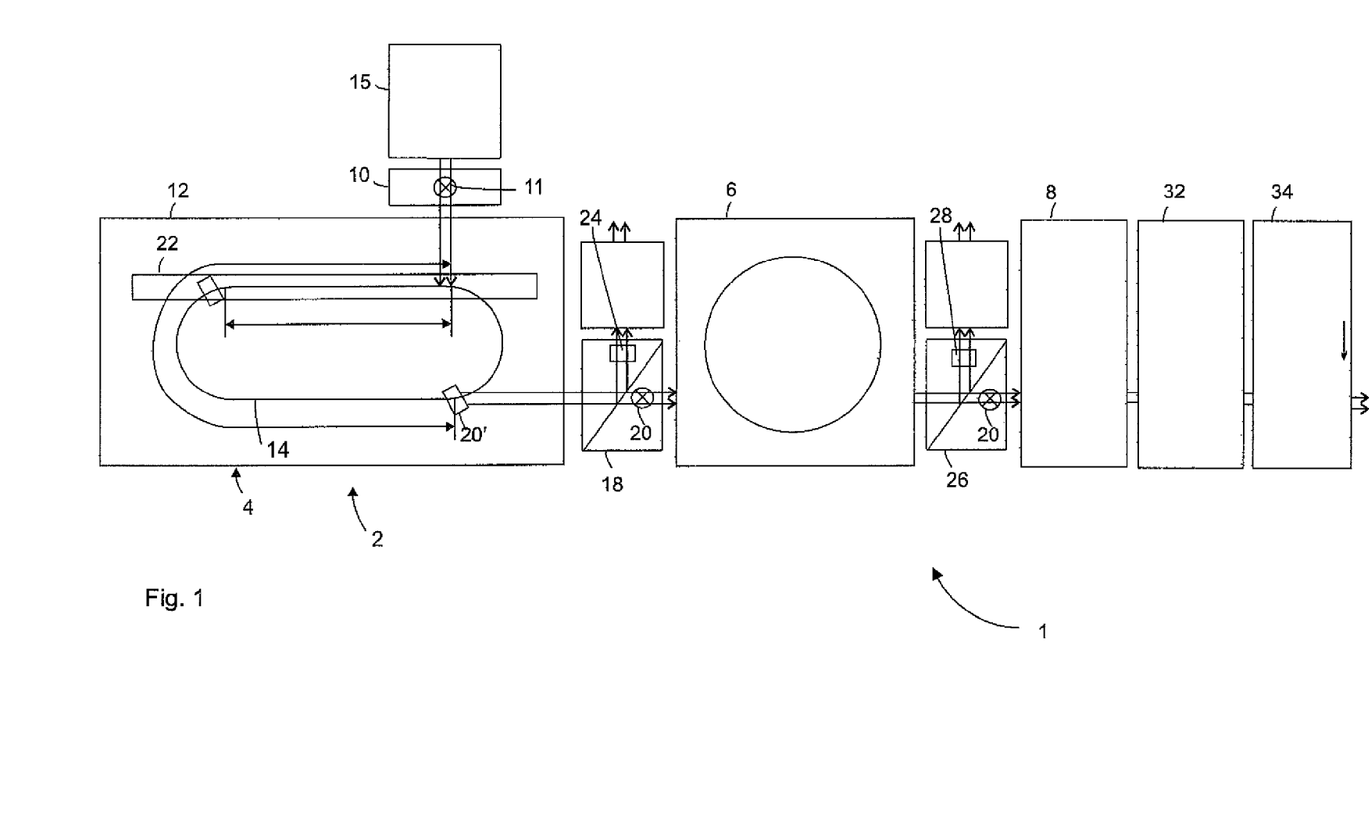
FIG. 1 is a diagrammatic illustration of an exemplary apparatus for the treatment of plastics material pre-forms in accordance with various aspects of the disclosure.

FIG. 1 shows an apparatus 1 for the production and further treatment of plastics material pre-forms or plastics material containers. The apparatus has in this case a conveying device which is designated only broadly diagrammatically 2 in its entirety and which conveys the plastics material pre-forms and subsequently the plastics material containers. In this case the conveying device 2 inside a heating device 4 can be for example a circulating chain which forms a partial length of the conveying device as a whole and on which a plurality of plastics material pre-forms are conveyed. The reference number 4 relates to the heating device. The conveying device can also, however, have other elements such as for example conveying star wheels or the like.

The reference number 14 designates the conveying—in particular of the plastics material pre-forms—through the heating device or a corresponding conveying device respectively. The reference number 10 designates broadly diagrammatically a supply device for the plastics material pre-forms to the heating device 4. The plastics material pre-forms can be supplied in this case from a storage container 15 for example.

The supply of the plastics material pre-forms into the heating device 2 can be interrupted by way of a blocking device 11. The reference number 22 designates a first diversion device for diverting the plastics material pre-forms. In this case it is possible for the plastics material pre-forms to be diverted out of the heating device 4 in the event of an error state occurring at this point. The background of this is that in this region the heating of the plastics material pre-forms has not yet advanced so far and so the plastics material pre-forms could be re-used. The reference number 18 designates in a diagrammatic manner a transfer device which transfers the heated plastics material pre-forms from the heating device to the shaping device 6. This too can be a conveying star wheel.

The reference number 20 designates a further blocking device which is arranged in this case between the heating device 4 and the shaping device 6 and by means of which the conveying of the plastics material pre-forms into the shaping device 6 can be interrupted. In this case too a further diversion device 24 can be provided which separates the completely heated plastics material pre-forms out from the conveying path.

The reference number 26 designates a transfer device, by means of which the containers now produced are transferred to a filling device 8. In this case too, a diversion device 28 can again be provided, by means of which already produced plastics material containers can be separated out before they reach the filling device 8. The reference numbers 32 and 34 designate further units of the plant such as for example a closure device 32 and a labelling machine 34. It is possible for errors, which affect the entire plant, also to occur in these further units. It may be advantageous for at least the filling device 8, the shaping device 6 and the heating device 4 to be operated as a block, i.e. in particular in a synchronized manner. The corresponding diversion apparatus 22, 24, and 28 are thus provided in the event of error states arising.

Figure 2:
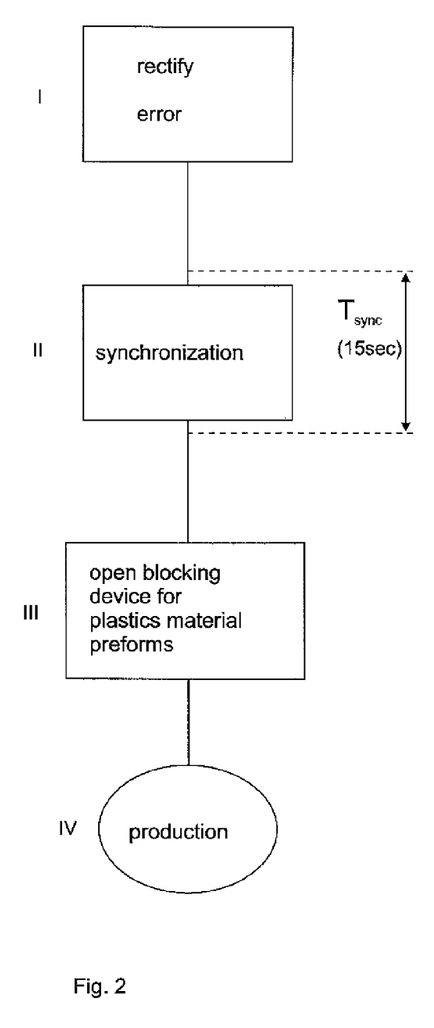
FIG. 2 is a flow chart for a method according to the prior art.

FIG. 2 is a diagrammatic illustration of a sequence for rectifying an error according to the prior art. An error in a machine, for example at the filling device 8, is rectified in stage I. After that, synchronization of this aforesaid machine with the preceding machines is again carried out (stage II). This synchronization can extend over a period of time $T_{Sync}$ of 15 seconds for example. After the synchronization is concluded, the blocking device 11 can be opened again (stage III) and plastics material pre-forms can be supplied to the heating device 4 again. In this time stage IV the production can be resumed in a normal manner again.

Figure 3:
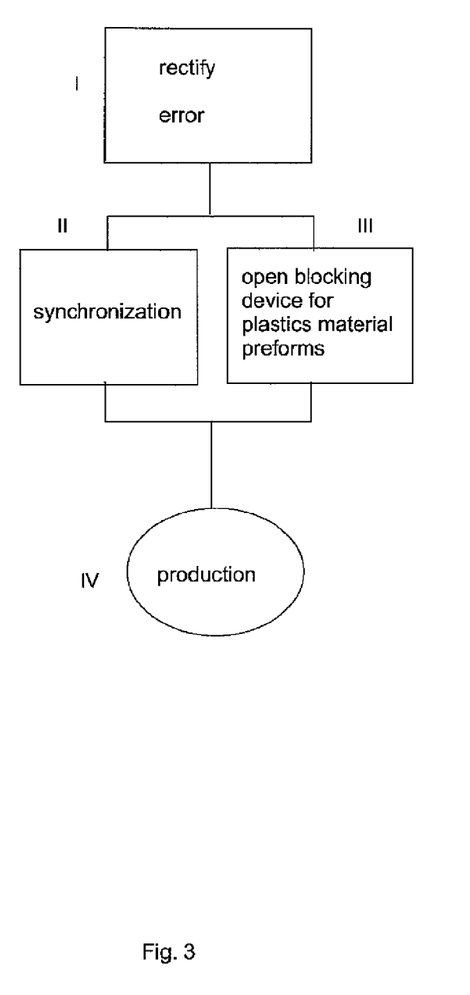
FIG. 3 is a flow chart for an exemplary method according to the disclosure.

FIG. 3 shows a sequence according to the disclosure. In this case too an error is first rectified in method step I, but during the synchronization in a method step or stage II the opening of the block 11 is carried out at least in part at the same time (stage III). It is evident that the production in method step IV can start earlier here, and in this case the 15 seconds are saved which are required for the synchronization of the following treatment device such as the filling device.

Figure 4:
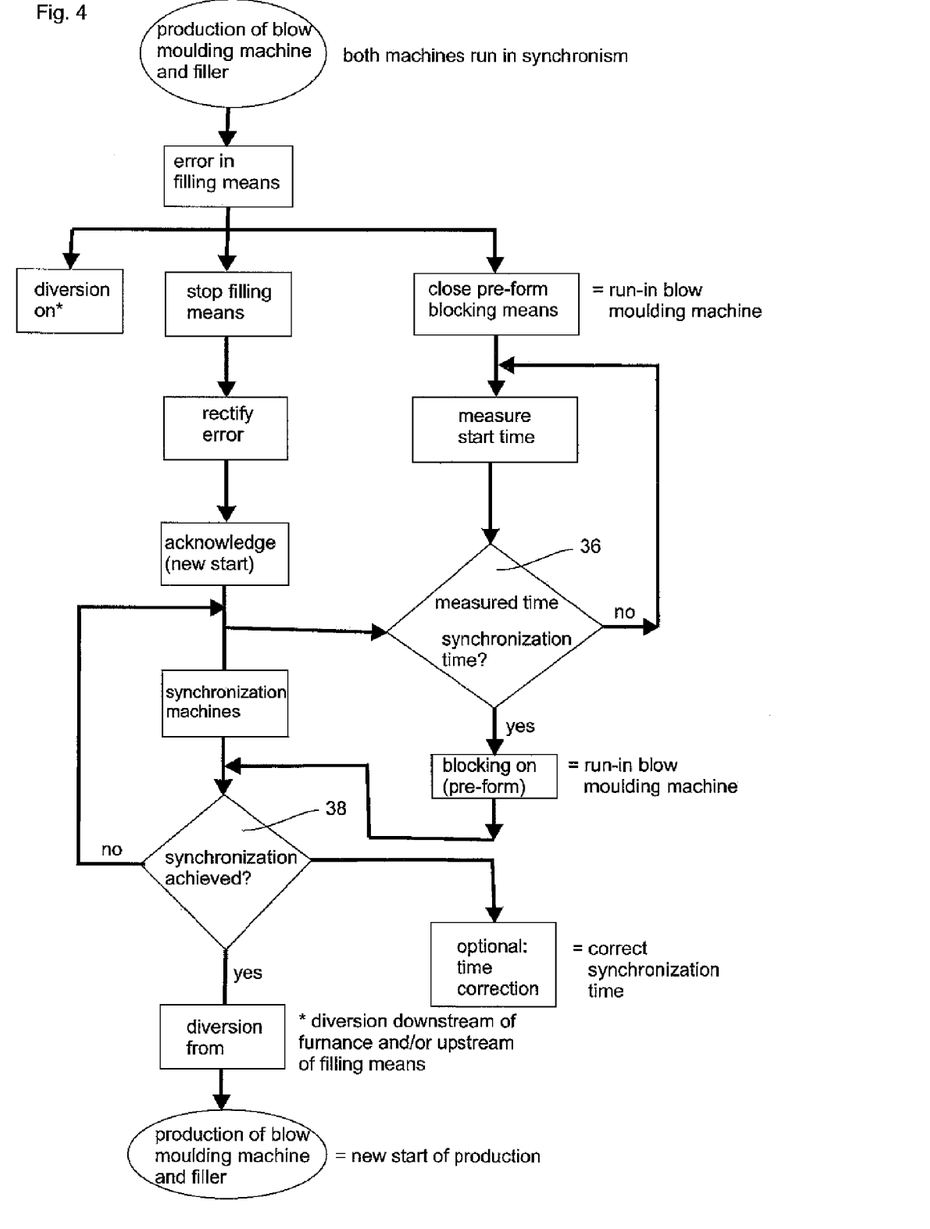
FIG. 4 is a detailed flow chart for an exemplary method according to the disclosure.

FIG. 4 is a detailed flow chart for a method according to the disclosure. In normal working operation, the filling device 8 and also the shaping machine 6, as well as also the heating device 4, run in synchronism in this case. By way of example, an error now occurs in the filling device 8. At the same time, a diversion is now activated, i.e. a diversion of the plastics material pre-forms downstream of the heating device 4 and/or also a diversion of the already shaped containers downstream of the shaping device 6. The filling device 8 is stopped accordingly and the blocking device 11 is closed, so that no further plastics material pre-forms run any longer into the heating device 4.

In addition, the time which has elapsed is now measured, whilst the blocking device 11 has stopped the supply of the plastics material pre-forms to the heating device 4. At the same time the error at the treatment machine arranged downstream, such as the filling device, can be rectified.

The measured time is now compared with the synchronization time. In addition, after the rectification a new start is made and acknowledges that the error is rectified. If the measured time is now greater than the synchronization time, the blocking device 11 is already opened at this time. This is carried out, however, only if it is reported to a processor device 36 that the filling device can be started again. The filling device 8 is now synchronized and at the same time the blocking device 11 is opened, i.e. plastics material pre-forms are now introduced into the heating device 4 again. A check is now made by way of a further regulating loop 38 as to whether the synchronization has already been achieved. In this period of time no diversion of plastics material pre-forms or plastics material containers is necessary, since at first no further plastics material pre-forms are conveyed out of the heating devices which are running empty at least in part.

If plastics material pre-forms are nevertheless conveyed forward again on account of a premature start of the supply of the pre-forms into the heating device, they can still be diverted provided that the synchronization has not yet been carried out. As soon as the synchronization has been carried out the diversion is also deactivated again and the plastics material pre-forms can again be transferred to the blow moulding machine or from the blow moulding machine further to the filling device. The production now begins again.

Figure 5:
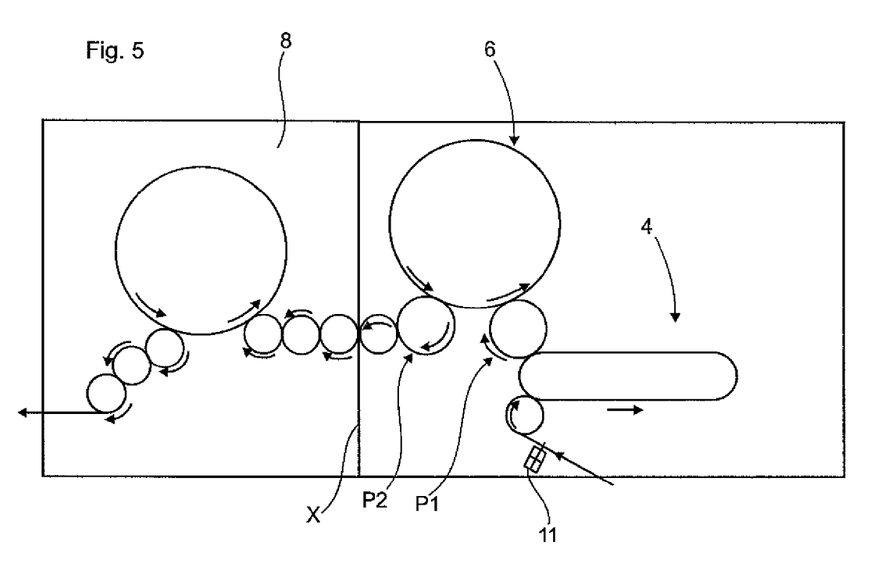
FIG. 5 is a further flow chart for an exemplary plant according to the disclosure.

FIG. 5 further shows an arrangement according to the disclosure. In this case too, a heating device is again provided, as well as a shaping device 6 and a filling means arranged downstream. The reference letter X designates the synchronization point. At this point a synchronization of the shaping device 6 and the filling device 8 must occur if the containers are transferred again. The duration of the conveying of the plastics material pre-forms until this synchronization point X can in turn—as mentioned above—be used for the synchronization, so that—as mentioned above—a saving in time can be achieved. The points P1 and P2 in each case indicate possibilities of a diversion. In this case heated plastics material pre-forms can be diverted at point P1 and already produced but still empty containers at point P2.

It will be apparent to those skilled in the art that various modifications and variations can be made to the method of treating plastics material pre-forms with reduction of time during the synchronization of parts of the plant of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. A method of treating plastics material pre-forms, comprising:
    conveying plastics material pre-forms by a conveying device;
    heating the plastics material pre-forms, during said conveying step, by a heating device; and
    treating the plastics material pre-forms, after said heating step, by a further treatment device in a further pre-set manner, the heating device and the further treatment device being operated in a synchronized manner at least for a time,
    wherein in the event of an error state occurring in said further treatment device downstream of the heating device, a supply of the plastics material pre-forms to the heating device is interrupted by a blocking device, discontinuing the synchronization such that no further plastics material pre-forms are conveyed to the heating device and no further plastics material pre-forms are conveyed between the heating device and the further treatment device, at least for a time, when the error state arises,
    wherein chronologically after the occurrence of the error state, a check of synchronization between the heating device and the further treatment device is performed by a regulating loop as to whether synchronization has taken place, whereupon, when the check indicates non-synchronization, the further treatment device is brought into synchronism again with the heating device during a pre-set synchronization period, and
    wherein the supply of the plastics material pre-forms to the heating device is permitted again, according to the check, during the synchronization period or at the start of the synchronization.

2. A method according to claim 1, wherein the further treatment device is a shaping device which shapes the plastics material pre-forms into plastics material containers.

3. A method according to claim 1, wherein a filling device, which fills the plastics material container with a liquid, is provided downstream of the further treatment device.

4. A method according to claim 1, further comprising:
    measuring time elapsed while blocking, via the blocking device, delivery of the supply of the plastics materials pre-forms to the heating device, to yield measured time;
    determining a duration of the synchronization time $T_{Sync}$;
    comparing the measured time to the duration of the synchronization time, to yield a comparison; and
    when the measured time exceeds the synchronization time, opening the blocking device such that the delivery of the supply of the plastics materials pre-forms to the heating device is reinitiated.

5. A method according to claim 1, further comprising determining a point in time permitting the supply of plastics material pre-forms in a manner dependent upon a length of time of the interruption of the supply of the plastics material pre-forms.

6. A method according to claim 1, further comprising separating out heated plastics material pre-forms and/or manufactured containers before reaching the filling device.

7. A method according to claim 6, further comprising heating once more, by the heating device, a pre-set portion of the separated out plastics material pre-forms.

8. An apparatus for the treatment of plastics material pre-forms, comprising:
    a conveying device configured to convey the plastics material pre-forms along a pre-set conveying path;
    a heating device configured to heat the plastics material pre-forms during said conveying;
    a shaping device arranged downstream of the heating device, the shaping device being configured to shape the heated plastics material pre-forms into plastics material containers;
    a filling device configured to fill the plastics material containers with a liquid, the heating device, the shaping device, and the filling device being synchronized with one another in a working operation of the apparatus;
    a regulating loop which performs a check as to whether synchronization between the heating device and the filling device has already occurred; and
    a blocking device arranged upstream of the heating device in the conveying direction of the plastics material pre-forms, the blocking device being structured and arranged to interrupt a supply of the plastics material pre-forms to the heating device in the event of an occurrence of an error state in the shaping device or the filling device arranged downstream of the heating device, the blocking device being controllably operated such that the blocking device can release the supply of the plastics material pre-forms to the heating device again at a point in time before the heating device and the shaping device or the filling device, arranged downstream of the heating device, are synchronized again.

9. An apparatus according to claim 8, further comprising a diversion device arranged downstream of the blocking device in order to separate the plastics material pre-forms out of the conveying path.

10. A method of treating plastics material pre-forms, comprising:
   conveying plastics material pre-forms by a conveying device;
   heating the plastics material pre-forms, during said conveying step, by a heating device;
   treating the plastics material pre-forms, after said heating step, by a further treatment device in a further pre-set manner, the heating device and the further treatment device being operated in a synchronized manner at least for a time;
   interrupting a supply of the plastics material pre-forms to the heating device by a blocking device in the event of an error state occurring in said further treatment device arranged downstream of the heating device;
   performing, by a regulating loop, a check as to whether synchronization between the heating device and the further treatment device;
   whereupon, upon non-synchronization being identified based on the check, re-synchronizing, chronologically after the occurrence of the error state, the further treatment device with the heating device during a pre-set synchronization period; and
   permitting again, at a start of or during the synchronization period, the supply of the plastics material pre-forms to the heating device.

11. A method according to claim 10, further comprising discounting the synchronization between the heating device and the further treatment device, at last for a time, when the error state arises.

12. A method according to claim 10, wherein the further treatment device is a shaping device which shapes the plastics material pre-forms into plastics material containers.

13. A method according to claim 10, wherein a filling device, which fills the plastics material containers with a liquid, is provided downstream of the further treatment device.

14. A method according to claim 10, further comprising determining a duration of the synchronization time $T_{Sync}$.

15. A method according to claim 10, further comprising determining a point in time of permitting the supply of the plastics material pre-forms in a manner dependent upon a length of time of the interruption of the supply of the plastics materials pre-forms.

16. A method according to claim 10, further comprising separating out heated plastics material pre-forms and/or manufactured containers before reaching the filling device.

17. A method according to claim 16, further comprising heating once more, by the heating device, a pre-set portion of the separated out plastics material pre-forms.

18. A method of treating plastics material pre-forms, comprising:
   conveying plastics material pre-forms by a conveying device;
   heating the plastics material pre-forms, during said conveying step, by a heating device; and
   treating the plastics material pre-forms, after said heating step, by a further treatment device in a further pre-set manner, the heating device and the further treatment device being operated in a synchronized manner at least for a time,
   wherein in the event of an error state occurring in said further treatment device downstream of the heating device, a supply of the plastics material pre-forms to the heating device is interrupted by a blocking device,
   wherein chronologically after the occurrence of the error state, a check of synchronization between the heating device and the further treatment device is performed by a regulating loop, such that, when the check indicates non-synchronization, the further treatment device is brought into synchronism again with the heating device during a pre-set synchronization period, and
   measuring time elapsed while blocking, via the blocking device, delivery of the supply of the plastics materials pre-forms to the heating device, to yield measured time;
   determining a duration of the synchronization time $T_{Sync}$;
   comparing the measured time to the duration of the synchronization time, to yield a comparison; and
   when the measured time exceeds the synchronization time, opening the blocking device such that the delivery of the supply of the plastics materials pre-forms to the heating device is reinitiated
   wherein the supply of the plastics material pre-forms to the heating device is permitted again, according to the check, during the synchronization period or at the start of the synchronization.

* * * * *